United States Patent
Tsutsui

(10) Patent No.: US 9,140,563 B2
(45) Date of Patent: Sep. 22, 2015

(54) MAP DISPLAY APPARATUS AND MAP DISPLAY METHOD

(75) Inventor: Masanao Tsutsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 1995 days.

(21) Appl. No.: 12/202,496

(22) Filed: Sep. 2, 2008

(65) Prior Publication Data

US 2009/0088968 A1    Apr. 2, 2009

(30) Foreign Application Priority Data

Oct. 2, 2007  (JP) ................. 2007-259192

(51) Int. Cl.
*G01C 21/00*    (2006.01)
*G01C 21/32*    (2006.01)

(52) U.S. Cl.
CPC ..................................... *G01C 21/32* (2013.01)

(58) Field of Classification Search
None
See application file for complete search history.

(56) References Cited

U.S. PATENT DOCUMENTS 5,802,492 A * 9/1998 DeLorme et al. .......... 455/456.5
7,305,102 B2 * 12/2007 Nagasaki ..................... 382/100

FOREIGN PATENT DOCUMENTS

| JP | 9-139906 | 5/1997 |
|---|---|---|
| JP | 2001-282813 | 10/2001 |
| JP | 2002-278993 | 9/2002 |
| JP | 2005-331388 | 12/2005 |
| JP | 2006-38515 | 2/2006 |
| JP | 2006-39723 | 2/2006 |
| JP | 2003-148514 | 6/2006 |
| JP | 2007-129407 | 5/2007 |

* cited by examiner

*Primary Examiner* — Michelle L Le
(74) *Attorney, Agent, or Firm* — Oblon, McClelland, Maier & Neustadt, L.L.P.

(57) ABSTRACT

A map display apparatus includes an image storage unit that stores images in association with corresponding items of image capturing position information of places where the images were captured; an image information reading unit that reads image capturing position information of a specified image from the image storage unit; an image capturing position displaying unit that displays a map represented by map information on the basis of the image capturing position information; a current position obtaining unit that obtains current position information from a position determining unit determining a current position; a current position displaying unit that displays a map represented by map information on the basis of the obtained current position information; and a map display switching unit that selectively switches between the map information of the image capturing position displaying unit and the map information of the current position displaying unit in response to a display switching instruction.

25 Claims, 5 Drawing Sheets

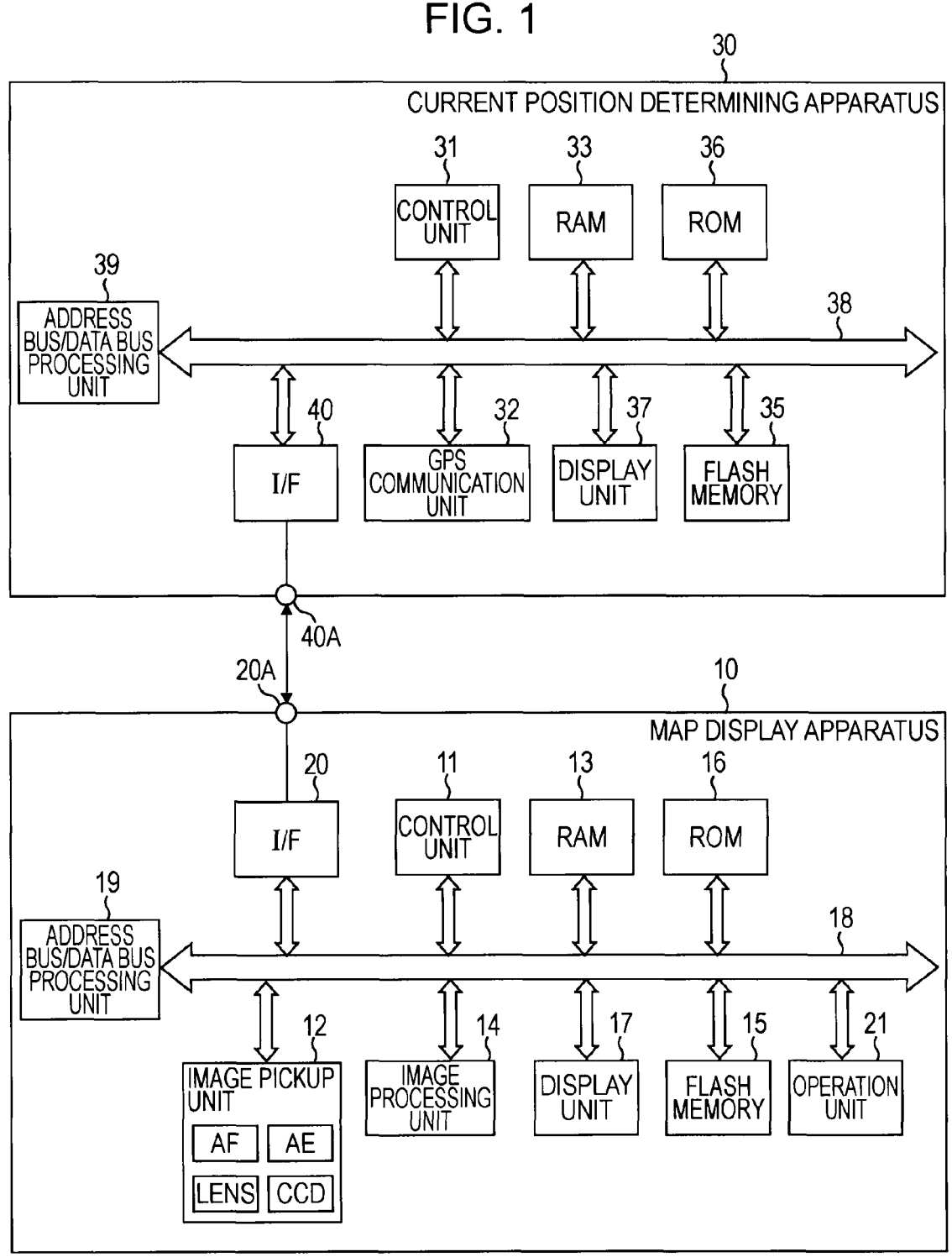

MAP DISPLAY APPARATUS AND MAP DISPLAY METHOD

CROSS REFERENCES TO RELATED APPLICATIONS

The present invention contains subject matter related to Japanese Patent Application JP 2007-259192 filed in the Japanese Patent Office on Oct. 2, 2007, the entire contents of which are incorporated herein by reference.

BACKGROUND OF THE INVENTION

1. Field of the Invention

The present invention relates to a map display apparatus and a map display method for displaying a map based on a reference position desired by a user.

2. Description of the Related Art

Car navigation systems are available as systems for displaying a map showing the current position in real-time. Car navigation systems are systems that provide a navigation function of detecting the current position using the Global Positioning System (GPS) in real-time and displaying and outputting a map showing the current position on the basis of the detection result in real-time. In order to more effectively realize the navigation function, there has been proposed an apparatus that applies an image capturing function and an image displaying function of a digital camera to a car navigation system.

For example, Japanese Unexamined Patent Application Publication No. 09-139906 discloses an image processing apparatus that provides a navigation function of outputting a map showing the current position at the center and, when the user took a photograph at a certain place in the past, shows on the map the position of that place where the photograph was taken.

SUMMARY OF THE INVENTION

Although the invention described in Japanese Unexamined Patent Application Publication No. 09-139906 can continuously display the map showing the current position at the center and the position of the place where the photograph was taken on the map, the invention has difficulty in displaying a map based on a reference position desired by the user, such as displaying a map showing at the center the position of the place where the photograph was taken.

It is desirable to display a map based on a reference position desired by a user.

According to an embodiment of the present invention, there is provided a map display apparatus including the following elements: image storage means for storing a plurality of images in association with corresponding items of image capturing position information of places where the plurality of images were captured; image information reading means for reading image capturing position information of a specified image from the image storage means; image capturing position displaying means for displaying a map represented by map information on a screen on the basis of the read image capturing position information; current position obtaining means for obtaining current position information from position determining means for determining a current position; current position displaying means for displaying a map represented by map information on a screen on the basis of the obtained current position information; and map display switching means for selectively switching between the map information of the image capturing position displaying means and the map information of the current position displaying means in response to a display switching instruction.

With the foregoing structure, besides current position information, images captured in the past and their corresponding items of image capturing position information are stored in a storage device. In response to a display switching instruction, a map represented by map information fulfilling a request is appropriately displayed by switching between map information based on which the current position represented by the current position information is displayed and map information based on which an image capturing position represented by a corresponding one of the image capturing position information stored in the storage device is displayed.

According to the embodiment of the present invention, map information is selectively switched in response to a display switching instruction between the map information of the image capturing position displaying means and the map information of the current position displaying means. Accordingly, a map based on a reference position desired by a user can be displayed.

BRIEF DESCRIPTION OF THE DRAWINGS

FIG. 1 is a block diagram showing an exemplary structure of a map display apparatus according to an embodiment of the present invention;

DESCRIPTION OF THE PREFERRED EMBODIMENTS

Figure 2A:
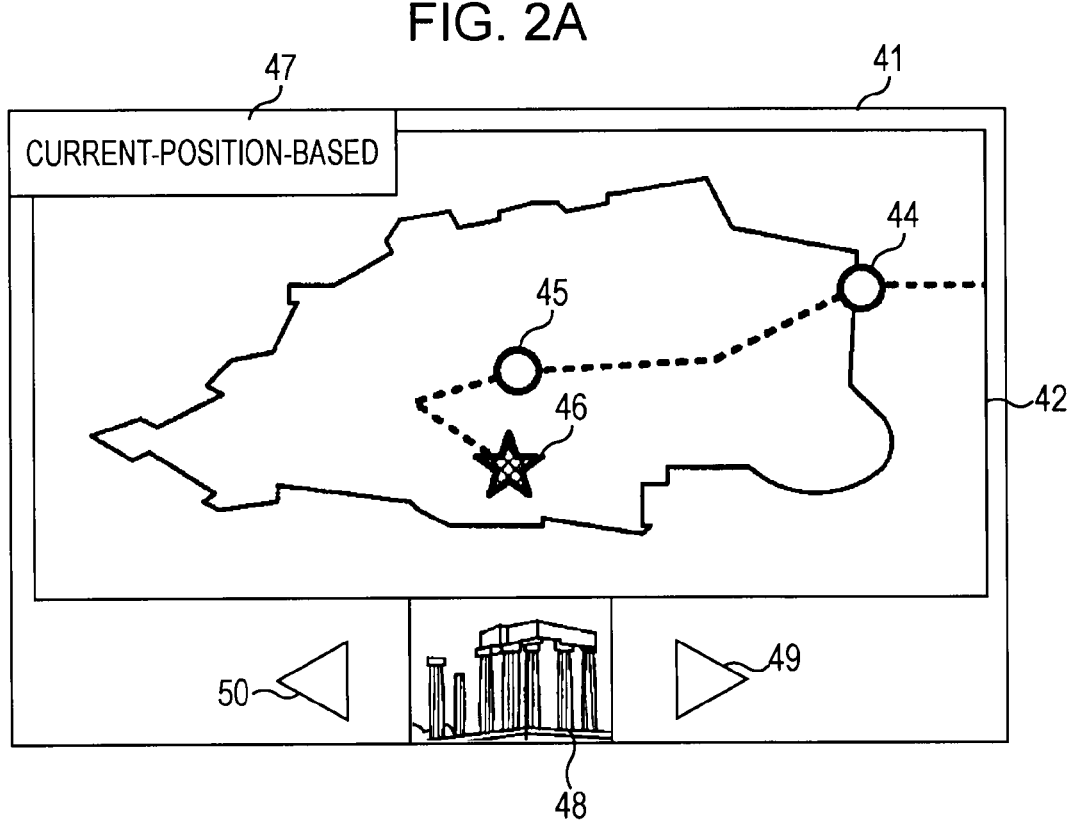
FIGS. 2A and 2B are illustrations of exemplary maps displayed by using the map display apparatus according to the embodiment of the present invention.

Hereinafter exemplary embodiments of the present invention will now be described with reference to the accompanying drawings.

In the following description of the embodiments, various limitations that are technically preferable are added to the description since they are preferred specific examples of the present invention. However, the present invention is not limited to these embodiments unless otherwise specified in the following description to limit the present invention. The dimensions, shapes, and arrangements which are used in the description and shown in the drawings are schematic representations showing examples.

Referring to the block diagram shown in FIG. 1, an exemplary internal structure of a system according to an embodiment of the present invention will now be described. A map display apparatus 10 shown in FIG. 1 is an example in which a map display apparatus according to an embodiment of the present invention is applied to a digital still camera. The map display apparatus 10 can communicate with a current position determining apparatus 30 via an interface (I/F) 20 and an input/output unit 20A and obtains position information of the map display apparatus 10 which is detected by using the current position determining apparatus 30. Further, the map display apparatus 10 and the current position determining apparatus 30 can be detachably connected to each other by using the input/output unit 20A of the map display apparatus 10 and an input/output unit 40A of the current position determining apparatus 30.

The map display apparatus 10 includes a control unit 11, an image pickup unit 12, a random access memory (RAM) 13, an image processing unit 14, a flash memory 15, a read-only memory (ROM) 16, a display unit 17, an address bus/data bus processing unit 19, the I/F 20, the input/output unit 20A, and an operation unit 21. Blocks in the map display apparatus 10 are interconnected by an address bus/data bus 18 that has two functions, namely, an address bus for transferring the address of each block and a data bus for transferring data among the blocks.

The control unit 11 controls the operation of the blocks included in the map display apparatus 10 via the address bus/data bus 18 and the address bus/data bus processing unit 19. On this occasion, the address bus/data bus processing unit 19 performs predetermined processing on the address and data input from each of the blocks in the map display apparatus 10. The control unit 11 is an example of image information reading means, current position obtaining means, and map display switching means described in the appended claims.

The image pickup unit 12 has a lens, an auto-focus (AF) function of performing automatic focusing, an automatic exposure (AE) function of automatically determining an aperture and an exposure time, and a charge-coupled device (CCD) which is a semiconductor device for converting the intensity of light into the intensity of electric charge. The image pickup unit 12 is a unit that captures images. The image pickup unit 12 converts captured image data into digital data (hereinafter referred to as "image data") and inputs the image data into the RAM 13.

The RAM 13 is a volatile storage device that temporarily stores data. The RAM 13 temporarily stores the image data captured by using the image pickup unit 12 and inputs the image data into the flash memory 15.

The flash memory 15 is a non-volatile semiconductor memory in which data stored therein is rewritable. The flash memory 15 is an example of image storage means. The flash memory 15 has a table for storing, in predetermined areas, the image data input from the RAM 13 and information indicating a position at which the image data was captured (hereinafter referred to as "image capturing position information"). That is, image data and its image capturing position information are stored in association with each other in the flash memory 15. Note that the image capturing position information stored in association with the image data in the RAM 13 is obtained from the current position determining apparatus 30 simultaneously as the image data is obtained by using the image pickup unit 12. Further, the flash memory 15 stores map data used in displaying a map.

The control unit 11 determines whether information indicating the current position of the map display apparatus 10 (hereinafter referred to as "current position information") can be obtained from the current position determining apparatus 30 or whether there is a display switching instruction. A condition or information for determining whether the current position information indicating the current position of the map display apparatus 10 can be obtained from the current position determining apparatus 30 will be described later. On the basis of the determination result, map data to be input from the flash memory 15 into the image processing unit 14 is determined. On this occasion, the flash memory 15 stores a setting indicating the relationship between the determination result of the function of obtaining the current position information and the map data to be input into the image processing unit 14 (hereinafter referred to as a "map display setting"). The map display setting will be described in more detail later.

The image processing unit 14 is an example of current position displaying means and image capturing position displaying means. The image processing unit 14 generates a map on the basis of the map data input from the flash memory 15 and outputs the generated map to the display unit 17.

The display unit 17 is implemented by, for example, a liquid crystal display and displays the map input from the image processing unit 14.

Next, the internal structure of the current position determining apparatus 30 will be described. The current position determining apparatus 30 includes a control unit 31, a GPS communication unit 32, a RAM 33, a flash memory 35, a ROM 36, a display unit 37, an address bus/data bus processing unit 39, an I/F 40, and the input/output unit 40A. Blocks in the current position determining apparatus 30 are interconnected by an address bus/data bus 38 that has two functions, namely, an address bus for transferring the address of each block and a data bus for transferring data among the blocks.

The control unit 31 controls the operation of the blocks included in the current position determining apparatus 30 via the address bus/data bus 38. On this occasion, the address bus/data bus processing unit 39 performs predetermined processing on the address and data input from each of the blocks in the map display apparatus 30.

The GPS communication unit 32 receives radio waves from GPS satellites. On the basis of the reception result of the GPS communication unit 32, the control unit 31 detects the current position information of the map display apparatus 10 at any time (in real-time) and sends the current position information to the map display apparatus 10 via the I/F 40 and the input/output unit 40A. When an image is captured by using the map display apparatus 10, similarly, the control unit 31 detects the image capturing position information on the basis of the reception result of the GPS communication unit 32 and sends the image capturing position information to the map display apparatus 10 via the I/F 40 and the input/output unit 40A.

Figure 2B:
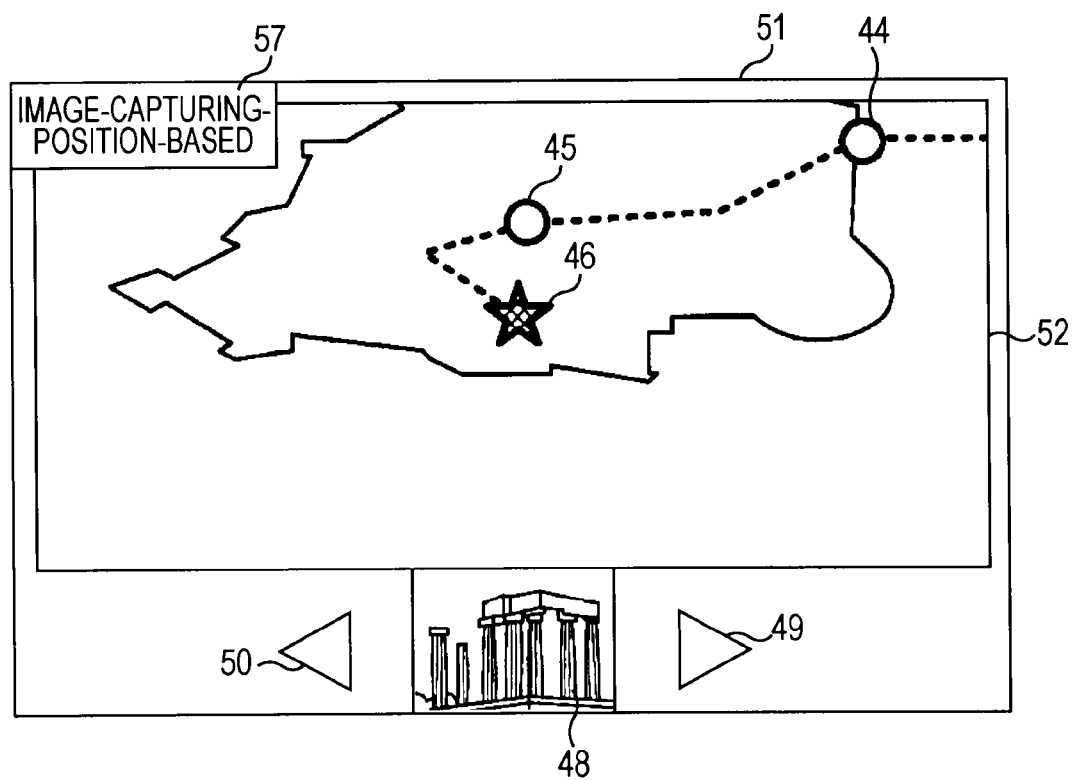

Referring now to FIGS. 2A and 2B, exemplary display screens generated by the image processing unit 14 in the map display apparatus 10 and displayed on the display unit 17 will be described. In the present embodiment, one of a display screen 41 shown in FIG. 2A and a display screen 51 shown in FIG. 2B is displayed on the display unit 17.

The display screen 41 includes a map 42 showing at the center an arbitrary image capturing position at which an image was captured in the past, an image display section 48, thumbnails 49 and 50, and a map display switching button 47.

Circles shown (mapped) on the map 42 represent image capturing positions 44 and 45 at which images were captured in the past. A star shown (mapped) on the map 42 represents the user's current position 46. Broken lines on the map 42 represent the user's traveling route. Since the traveling route is interrupted at the current position 46, the image capturing position 45 is the position at which the most recent image was captured.

The image display section 48 displays an image captured at the image capturing position 45 which is positioned at the center of the map 42. The thumbnails 49 and 50 are images that can be displayed as images to be displayed in the image display section 48 on the basis of an operation entered by the user through the operation unit 21, instead of, for example, an image captured at the image capturing position 45.

For example, a graphical user interface (GUI) is used as the map display switching button 47. By operating the map display switching button 47 using the operation unit 21, the display screen 41 is switched to the display screen 51.

The display screen 51 includes a map 52 showing the user's current position 46 at the center, the image display section 48, the thumbnails 49 and 50, and a map display switching button 57. Elements of the display screen 51 which are given the same reference numerals as those of the display screen 41 are not described to avoid repeated description.

The map 52 is another version of the map 42 and shows the current position 46 at the center. For example, a GUI is used as the map display switching button 57. As in the map display switching button 47 of the display screen 41, the map display switching button 57 serves as a function of switching the display screen 51 to the display screen 41 in response to an operation entered by the user through the operation unit 21. In the present embodiment, the map display switching buttons 47 and 57 using GUIs are provided. Alternatively, for example, a physical button may be provided in a main body of the map display apparatus 10. When the user directly operates this physical button, the display screen 41 may be switched to the display screen 51, and vice versa.

Figure 3:
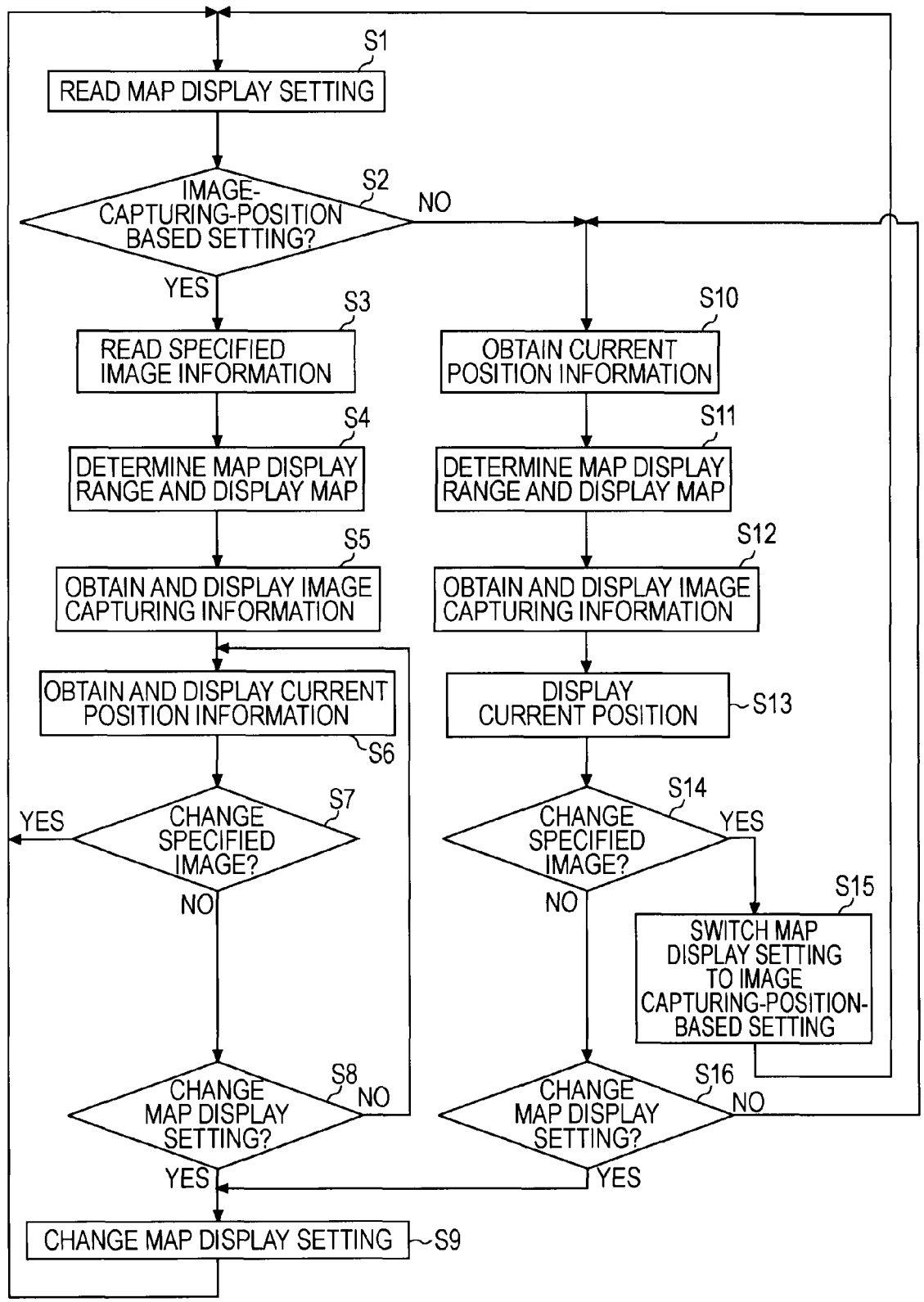
FIG. 3 is a flowchart for describing the operation of the map display apparatus according to the embodiment of the present invention.

FIG. 3 is a flowchart for describing a method of displaying a map using the map display apparatus according to the embodiment of the present invention. Referring to FIG. 3, an exemplary map displaying process by using the control unit 11 of the map display apparatus 10 will be described. The map displaying process is in an exemplary case in which a display switching instruction is given by using a GUI provided on a display screen.

The power of the map display apparatus 10 is switched on in response to a user instruction, or a map display mode is selected from a menu (not shown). The control unit 11 reads a map display setting previously selected by the user from the flash memory 15 (step S1). Note that the present embodiment has the following map display settings: a setting for generating a map on the basis of image capturing position information (hereinafter referred to as an "image-capturing-position-based setting"); and a setting for generating a map on the basis of current position information (hereinafter referred to as a "current-position-based setting").

Next, the control unit 11 determines whether the map display setting read in the processing in step S1 is the image-capturing-position-based setting or the current-position-based setting (step S2). When the map display setting is the image-capturing-position-based setting (yes in step S2), the control unit 11 reads image capturing position information corresponding to a specified image, such as an image that was most recently captured by using the image pickup unit 12, from the flash memory 15 (step S3).

Here, the control unit 11 determines a map display range on the basis of the image capturing position information corresponding to the most recently captured image. The control unit 11 inputs map data corresponding to the map display range from the flash memory 15 into the image processing unit 14, and generates the map 42 showing the image capturing position 45 at the center, as shown in FIG. 2A (step S4). Alternatively, the map display range may be determined on the basis of image capturing position corresponding to an image captured prior to the most recently captured image. For example, referring back to FIG. 2A, a map showing a position other than the image capturing position 45, such as the image capturing position 44, at the center may be displayed.

The control unit 11 searches for images having items of image capturing position information corresponding to the map display range. On the basis of these items of image capturing position information, the control unit 11 maps image capturing positions within the map display range of the map 42 shown in FIG. 2A (the image capturing positions 44 and 45 in this example) onto the map 42 (step S5).

Further, the control unit 11 obtains current position information from the current position determining apparatus 30, maps the current position 46 shown in FIG. 2A onto the map 42 on the basis of the obtained current position information (step S6), and displays the map 42 on the display unit 17. Note that the control unit 11 does not change the map display setting even when the current position 46 is outside the displayable range of the map 42.

When an operation is performed on the thumbnail 49 or 50 of the display screen 41 to change the image to be displayed in the image display section 48 (yes in step S7), the flow returns to the processing in step S1, and the processing in steps S2 to S5 is performed on the basis of image capturing position information corresponding to the image updated in the processing in step S7 where the determination has been "yes".

In contrast, when the image to be displayed in the image display section 48 is not to be changed (no in step S7), the flow proceeds to the processing in step S8.

When the display screen 41, which is currently being displayed, is not to be changed in step S8 (no in step S8), the flow returns to the processing in step S6, and the control unit 11 changes the current position 46 to be mapped onto the map 42 in real-time.

In contrast, when the display screen 41, which is currently being displayed, is to be changed, the user selects the map display switching button 47 by operating the operation unit 21 (yes in step S8).

Then, the control unit 11 changes the map display setting from the image-capturing-position-based setting to the current-position-based setting and stores the updated map display setting (current-position-based setting) in the flash memory 15 (step S9).

The flow returns to the processing in step S1. The control unit 11 reads the map display setting (current-position-based setting) previously selected by the user from the flash memory 15 (step S1).

Since the map display setting read in the processing in step S1 is the current-position-based setting (no in step S2), the control unit 11 obtains the user's current position information from the current position determining apparatus 30 (step S10).

Figure 4:
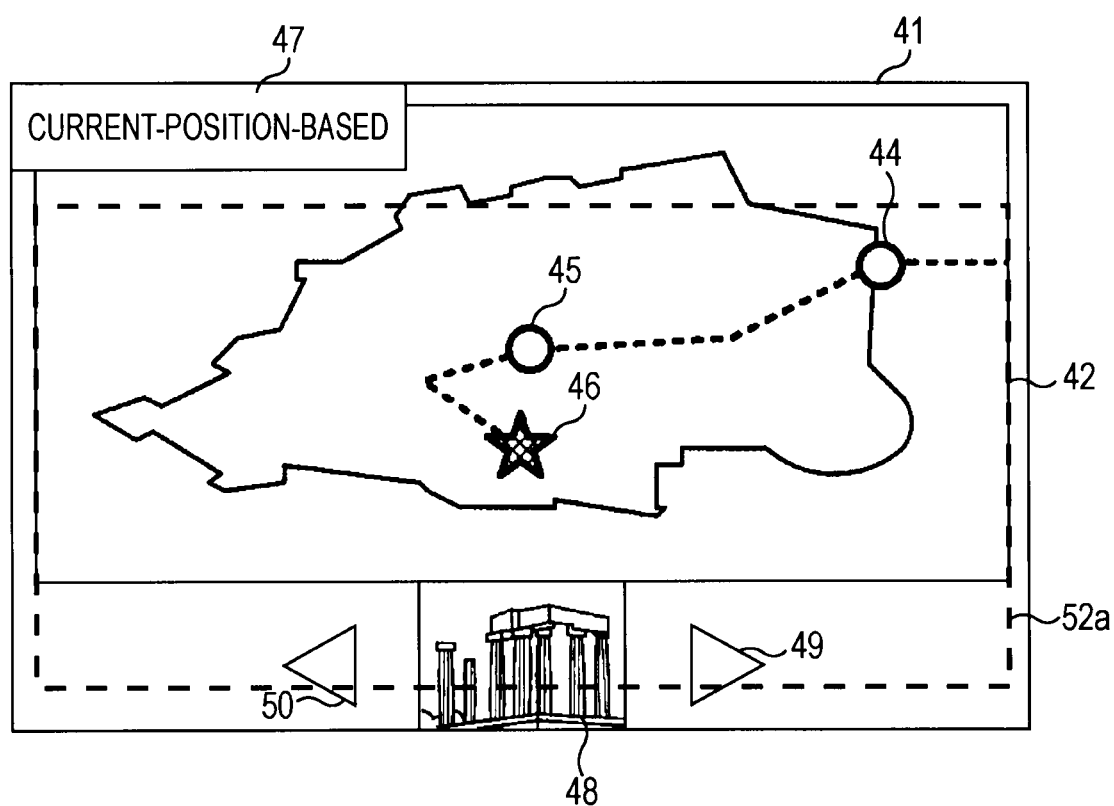
FIG. 4 is an illustration of an exemplary cutout of the exemplary map displayed by using the map display apparatus according to the embodiment of the present invention.

On the basis of the user's current position information obtained in step S10, the control unit 11 changes the map display range to a range 52*a* showing the current position 46 at the center, as shown in FIG. 4. The control unit 11 inputs map data corresponding to this map display range (range 52*a*) from the flash memory 15 into the image processing unit 14 and generates the map 52 corresponding to the range 52*a* (step S11).

The control unit 11 searches for images having items of image capturing position information corresponding to the map display range. On the basis of these items of image capturing position information, the control unit 11 maps image capturing positions within the map display range of the map 52 shown in FIG. 2B (the image capturing positions 44 and 45 in this example) onto the map 52 (step S12).

Further, on the basis of the current position information obtained in the processing in step S10, the control unit 11 displays the display screen 51 in which the current position 46 shown in FIG. 2B is mapped onto the map 52 on the display unit 17 (step S13). Here, the map display mode can be switched by changing a specified image or operating the map display switching button 57 or the like. A detailed description thereof is given later.

The processing in the case where the initial map display setting is the current-position-based setting will now be described. When the map display setting read from the flash memory 15 is not the image-capturing-position-based setting in step S2 (no in step S2), the control unit 11 obtains the user's current position information (step S10), and displays the display screen 51 including the map 52 based on the current position information on the display unit 17 (steps S11 to S13).

When the image to be displayed in the image display section 48 is changed by performing an operation on the thumbnail 49 or 50 in the display screen 51 (yes in step S14), the control unit 11 switches the map display setting to the image-capturing-position-based setting (step S15), and stores the map display setting (image-capturing-position-based setting) in the flash memory 15. The flow returns to the processing in step S1, and the processing in steps S2 to S5 is performed on the basis of image capturing position information corresponding to the image updated in the processing in step S14.

In contrast, when the image to be displayed in the image display section 48 in the display screen 51 is not to be changed (no in step S14), the flow proceeds to the processing in step S16.

When it is determined in the processing in step S16 that the currently displayed display screen 51 is not to be changed (no in step S16), the flow returns to the processing in step S10, and the processing in steps S10 to S13 is performed. The control unit 11 displays a map constantly showing the user's current position at the center in real-time.

In contrast, when the currently displayed display screen 51 is to be changed, the user selects the map display switching button 57 by operating the operation unit 21 (yes in step S16).

The control unit 11 changes the map display setting to the image-capturing-position-based setting, and stores the currently selected map display setting (image-capturing-position-based setting) in the flash memory 15 (step S9).

The flow returns to the processing in step S1. The control unit 11 reads the map display setting previously selected by the user (image-capturing-position-based setting) from the flash memory 15 (step S1).

Since the map display setting read in the processing in step S1 is the image-capturing-position-based setting (yes in step S2), the control unit 11 reads image capturing position information corresponding to the most recently captured image from the flash memory 15 (step S3). The control unit 11 displays the display screen 51 shown in FIG. 2B on the display unit 17 (steps S4 to S6). By operating the map display switching button 47 or the like, the map display mode can be switched.

In the foregoing embodiment of the present invention, the user can easily switch between the map display mode based on the image capturing position (hereinafter referred to as the "image-capturing-position-based mode") and the map display mode based on the current position (hereinafter referred to as the "current-position-based mode") by using the map display switching buttons 47 and 57 which are provided in the display screens 41 and 51, respectively, and implemented by GUIs or the like. Therefore, the user can select the map display mode that suits the purpose on a case-by-case basis.

When the user enters an operation to change the image to be displayed in the image display section 48 by performing an operation on the thumbnail 49 or 50 displayed together with a map while the map is being displayed using the current-position-based setting, the current-position-based setting can be cleared, and the setting can be automatically changed to the image-capturing-position-based setting. Accordingly, a current-position-based map image can be automatically switched to an image-capturing-position-based map image. The user can thus display a desired map without performing a complicated operation.

While the user is traveling, current-position-based display can be switched to image-capturing-position-based display, and an image captured in the past can be browsed on the map. In this case, image-capturing-position-based display is persistently maintained. When the current position moves out of the map display range, the current position is not displayed on the map. Therefore, there is an advantage that the user can view a previously captured image while traveling.

A map display apparatus according to another embodiment of the present invention will now be described.

Figure 5:
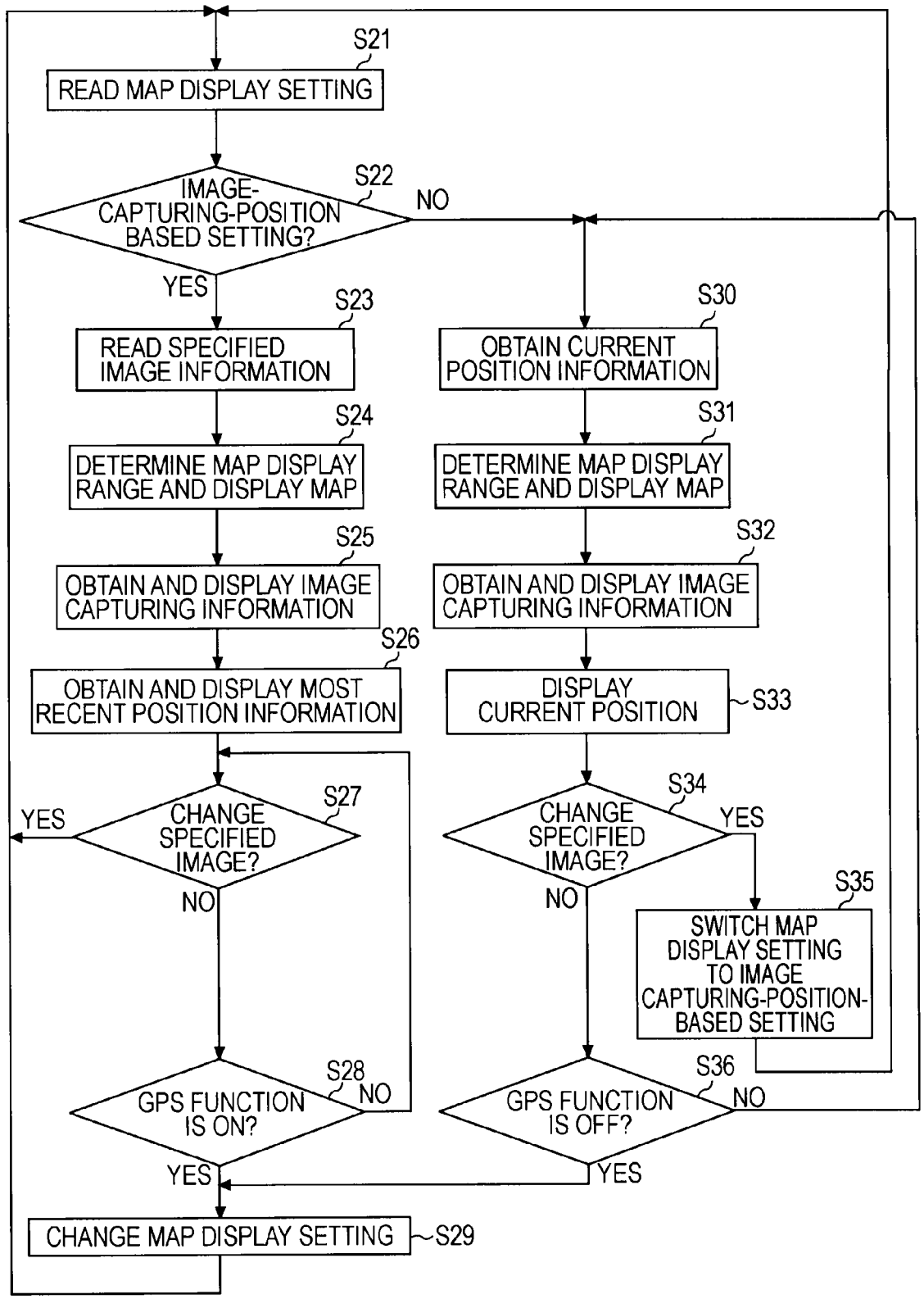
FIG. 5 is a flowchart for describing the operation of a map display apparatus according to another embodiment of the present invention.

FIG. 5 is a flowchart for describing the operation of the map display apparatus according to the other embodiment of the present invention. Referring to the flowchart shown in FIG. 5, an exemplary map displaying process by using the control unit 11 of the map display apparatus 10 will be described. The map displaying process is in an exemplary case in which the map display apparatus 10 determines whether current position information can be obtained from the current position determining apparatus 30 and, on the basis of the determination result, that is, by using the determination result as a display switching instruction, selectively switches between map information in an image-capturing-position display mode and map information in a current-position display mode.

The flowchart shown in FIG. 5 is similar to that shown in FIG. 3 except that the processing in steps S6, S8, and S16 of FIG. 3 is changed to the processing in steps S26, S28, and S36 of FIG. 5. Since the processing in the other steps S23 to S25, S27, and S29 to S35 is common to that in steps S3 to S5, S7, and S9 to S15 of FIG. 3, a detailed description thereof is omitted to avoid redundancy.

The control unit 11 of the map display apparatus 10 reads map display setting from the flash memory 15 (step S21). The map display setting is forcedly determined depending on whether current position information of the map display apparatus 10 can be obtained from the current position determining apparatus 30. That is, when the current position information can be obtained, the map display setting is the current-position-based setting. When the current position information is difficult to be obtained, the map display setting is the image-capturing-position-based setting.

Here, when the read map display setting is the setting indicating image capturing position information (yes in step S22), the control unit 11 obtains image capturing position information corresponding to the most recently captured image (step S23).

The control unit 11 inputs map data based on the image capturing position information from the flash memory 15 into the image processing unit 14 and generates the map 42 (step S24).

Here, the control unit 11 maps image capturing positions within the display range of the map 42, such as the image capturing positions 44 and 45 shown in FIG. 2A, onto the map 42 on the basis of the image capturing position information (step S25).

Further, the control unit 11 obtains position information that is most recently obtained from the current position determining apparatus 30 (hereinafter referred to as "most recent position information"), maps the current position 46 shown in FIG. 2B onto the map 42 on the basis of the most recent position information (step S26), and displays the display screen 41 on the display unit 17.

When the image to be displayed in the image display section 48 of the display screen 41 is not to be changed (no in step S27), the flow proceeds to the processing in step S28.

The control unit 11 determines whether the current position information can be obtained from the current position determining apparatus 30, that is, whether the GPS function is turned on (step S28). For example, when the control unit 11 is incapable of obtaining the current position information, that is, when the GPS function is turned off, since the connection between the map display apparatus 10 and the current position determining apparatus 30 has been broken by disconnecting the current position determining apparatus 30 from the map display apparatus 10 (no in step S28), the flow returns to the processing in step S27.

In contrast, when the current position information can be obtained from the current position determining apparatus 30 (yes in step S28), the control unit 11 changes the map display setting to the current-position-based setting and stores the currently selected map display setting (current-position-based setting) in the flash memory 15 (step S29).

The flow returns to the processing in step S21, and the control unit 11 reads the map display setting which is previously selected by the user (current-position-based setting) from the flash memory 15 (step S21).

Since the map display setting read in the processing in step S21 is the current-position-based setting (no in step S22), the control unit 11 can obtain the user's current position information from the current position determining apparatus 30 (step S30).

Here, the control unit 11 inputs map data based on the user's current position information from the flash memory 15 into the image processing unit 14, changes the map display range to the range 52a showing the current position 46 at the center, as shown in FIG. 4, and generates the map 52 corresponding to the range 52a (step S31).

On the basis of the image capturing position information, the control unit 11 maps image capturing positions within the display range of the map 52, such as the image capturing positions 44 and 45 shown in FIG. 2B, onto the map 52 (step S32).

Further, the control unit 11 obtains the current position information from the current position determining apparatus 30, maps the current position 46 shown in FIG. 2B onto the center of the map 52 on the basis of the current position information (step S33), and displays the display screen 51 on the display unit 17. Here, the map display mode can be switched by changing a specified image or disconnecting the current position determining apparatus 30 from the map display apparatus 10.

The processing in the case where the initial map display setting is the current-position-based setting will now be described. In step S22, when the map display setting read from the flash memory 15 is the current-position-based setting (no in step S22), the control unit 11 obtains the user's current position information (step S30) and displays the map 52 based on the current position information on the display screen 51 of the display unit 17 (steps S31 to S33).

When the image to be displayed in the image display section 48 is changed by performing an operation on the thumbnail 49 or 50 in the display screen 51 (yes in step S34), the control unit 11 switches the map display setting to the image-capturing-position-based setting (step S35), and stores the map display setting (image-capturing-position-based setting) in the flash memory 15. The flow returns to the processing in step S21, and the control unit 11 performs the processing in steps S22 to S25 on the basis of image capturing position information corresponding to the image updated in the processing in step S34.

In contrast, when the image to be displayed in the image display section 48 shown in FIG. 2B is not to be changed (no in step S34), the flow proceeds to step S36.

Here, the control unit 11 determines whether the current position information can be obtained from the current position determining apparatus 30, that is, whether the GPS function is turned on or off (step S36). When the current position information can be obtained, that is, when the GPS function is turned on, since the current position determining apparatus 30 has been connected to the map display apparatus 10 or the like (no in step S36), the flow returns to the processing in step S30. The control unit 11 performs the processing in steps S30 to S33 and displays a map constantly showing the user's current position at the center in real-time.

In contrast, when the control unit 11 is incapable of obtaining the current position information, that is, when the GPS function is turned off, since the current position determining apparatus 30 has been disconnected from the map display apparatus 10 (yes in step S36), the control unit 11 changes the map display setting to the image-capturing-position-based setting and stores the currently selected map display setting (image-capturing-position-based setting) in the flash memory 15 (step S29).

The flow returns to the processing in step S21, and the control unit 11 reads the map display setting which is previously selected by the user (image-capturing-position-based setting) from the flash memory 15 (step S21).

Since the map display setting read in the processing in step S21 is the image-capturing-position-based setting (yes in step S22), the control unit 11 reads image capturing position information corresponding to the most recently captured image from the flash memory 15 (step S23).

Here, the control unit 11 displays the display screen 51 shown in FIG. 2B on the display unit 17 (steps S24 to S26). By connecting the current position determining apparatus 30 to the map display apparatus 10, the map display apparatus 10 can obtain the current position information. Accordingly, the map display mode can be switched.

In the other embodiment of the present invention described above, it is determined whether the map display apparatus 10 can obtain the current position information from the current position determining apparatus 30. On the basis of the determination result, the mode can be selectively switched between the image-capturing-position-based mode and the current-position-based mode. In addition to the previous embodiment, there is an advantage that the map display mode is automatically switchable depending on whether the current position information can be obtained from the current position determining apparatus 30.

In the foregoing embodiment, whether the current position information can be obtained from the current position determining apparatus 30 is switched by connecting/disconnecting the current position determining apparatus 30 to/from the map display apparatus 10. In this case, since the map display mode can be switched simply by connecting/disconnecting the current position determining apparatus 30 to/from the map display apparatus 10, the operation is easy for the user.

For example, when the user gets home from a trip, it is unnecessary for the user to know the current position. Thus, the user disconnects the current position determining apparatus 30 from the map display apparatus 10, and the map display setting is forcedly switched to the image-capturingposition-based display setting. There is an advantage that the user can use the map display setting that suits the purpose without being conscious of it.

Instead of connecting/disconnecting the current position determining apparatus 30 to/from the map display apparatus 10, a physical switch for switching on/off the GPS function may be provided in the main body of the map display apparatus 10. By switching on/off the physical switch, the GPS function can be turned on/off (activated/deactivated). For example, when the map display apparatus 10 contains a GPS unit, it is difficult to connect/disconnect the current position determining apparatus 30 (GPS unit) to/from the map display apparatus 10. However, when the GPS function can be turned on/off by operating the physical switch, an advantage similar to that obtained in the case where the current position determining apparatus 30 is connected/disconnected to/from the map display apparatus 10 can be achieved. Further, even when no power is being supplied to the map display apparatus 10, the control unit 11 can read the setting of the physical switch, and the map display mode is switched. Therefore, there is an advantage that the map display mode upon activation of the map display apparatus 10 can be made the map display mode desired by the user.

It should be understood by those skilled in the art that various modifications, combinations, sub-combinations, and alterations may occur depending on design requirements and other factors insofar as they are within the scope of the appended claims or the equivalents thereof.

In the foregoing embodiments, a position at which a still image was captured is indicated. Alternatively, a position at which a moving image was captured may be indicated. For example, a thumbnail (reduced image) of a moving image captured while the user is traveling is reproduced by changing a map to be displayed so that the map constantly shows the image capturing position of the moving image at the center of the map in accordance with the movement of the image capturing position of the moving image.

When the GPS communication unit 32 included in the current position determining apparatus 30 is incapable of receiving radio waves from GPS satellites, as in the foregoing embodiments, the map display apparatus 10 is incapable of obtaining the current position information. Therefore, the map display mode is forcedly switched to the image-capturing-position-based mode. Thereafter, when the GPS communication unit 32 becomes capable of receiving radio waves from GPS satellites, the map display apparatus 10 switches the map display mode to the current-position-based mode. Alternatively, the map display mode becomes selectable between the image-capturing-position-based mode and the current-position-based mode.

In the foregoing embodiments, position information is transferred via a communication line (e.g., plugs) between the map display apparatus 10 and the current position determining apparatus 30. Alternatively, instead of using the communication line, position information can be transferred using a wireless communication channel. In this case, the map display mode is selectable by selecting whether to transfer the current position information from the current position determining apparatus 30 to the map display apparatus 10. When wireless communication is disabled, the map display apparatus 10 is incapable of obtaining the current position information. Thus, the map display mode is forcedly switched to the image-capturing-position-based mode. Thereafter, when wireless communication becomes enabled, the map display apparatus 10 switches the map display mode to the current-position-based mode. Alternatively, the map display mode becomes selectable between the image-capturing-position-based mode and the current-position-based mode.

Although examples in which a map display apparatus according to an embodiment of the present invention is applied to a digital still camera have been described above, the present invention is not limited thereto. For example, the map display apparatus is applicable to various apparatuses including a digital video camera (camcorder), a personal computer, a mobile phone, and a mobile game machine.

What is claimed is:

1. A map display controlling apparatus comprising:
   image information reading means for reading image capturing position information of a specified image from a memory;
   image capturing position display controlling means for controlling displaying a map represented by map information on a screen on the basis of the read image capturing position information;
   current position obtaining means for obtaining current position information from position determining means for determining a current position;
   current position display controlling means for controlling displaying a map represented by map information on a screen on the basis of the obtained current position information; and
   map display switching means for selectively switching between the map information of the image capturing position display controlling means and the map information of the current position display controlling means in response to a display switching instruction.

2. The map display apparatus according to claim 1, wherein the image capturing position display controlling means controls displaying the map represented by the map information so that an image capturing position represented by the image capturing position information of the specified image is displayed at a predetermined position on the map, and the current position display controlling means controls displaying the map represented by the map information so that the current position represented by the current position information is displayed at a predetermined position on the map.

3. The map display apparatus according to claim 2, wherein the predetermined positions are substantially the center of the maps, respectively.

4. The map display apparatus according to claim 2, wherein the map display switching means switches between the map information of the image capturing position display controlling means and the map information of the current position display controlling means in response to the display switching instruction given by a graphical user interface provided on a display screen.

5. The map display apparatus according to claim 2, further comprising:
   determining means for determining a state of the current position obtaining means whether the current position obtaining means is capable or incapable of obtaining the current position information from the position determining means,
   wherein the map display switching means selectively switches between the map information of the image capturing position display controlling means and the map information of the current position display controlling means by using a determination result obtained by the determining means as the display switching instruction.

6. The map display apparatus according to claim 5, wherein the position determining means is configured to be detachably connectable to the map display apparatus, and the state of the current position obtaining means is switched between that in which the current position obtaining means is capable of obtaining the current position information from the position determining means and that in which the current position obtaining means is incapable of obtaining the current position information from the position determining means by connecting or disconnecting the position determining means to or from the map display apparatus.

7. The map display apparatus according to claim 5, further comprising:
switching means for switching between activation and deactivation of the position determining means.

8. The map display apparatus according to claim 7, wherein the switching means is provided in a main body of the position determining means.

9. The map display apparatus according to claim 5, wherein the current position display controlling means controls displaying the map represented by the map information on the screen on the basis of the current position information obtained from the position determining means immediately before the current position obtaining means enters the state in which the current position obtaining means is incapable of obtaining the current position information from the position determining means.

10. The map display apparatus according to claim 2, further comprising:
image selecting means for selecting an image to be displayed in part of each of the screens, wherein,
when the current position display controlling means displays the map represented by the map information on the screen, in a case where the image selecting means selects an image, the map display switching means switches the map information representing the map displayed on the screen to the map information of the image capturing position display controlling means.

11. The map display apparatus according to claim 2, wherein, when the image capturing position display controlling means controls displaying the map represented by the map information on the screen, and when the current position represented by the current position information obtained by the current position obtaining means is to be displayed at a corresponding position on the map, in a case where the corresponding position does not exist in the displayed map represented by the map information, the map display switching means does not switch the map information.

12. The map display apparatus according to any one of claims 3 to 11, further comprising:
image pickup means, wherein the plurality of images were captured by the image pickup means.

13. A map display method comprising:
reading a corresponding item of image capturing position information of one of a plurality of stored images;
controlling displaying a map represented by map information on a screen on the basis of the read image capturing position information;
obtaining current position information for determining a current position;
controlling displaying a map represented by map information on a screen on the basis of the obtained current position information; and
selectively switching between the map information used to control displaying an image capturing position represented by the read image capturing position information and the map information used to control displaying the current position represented by the obtained current position information in response to a display switching instruction.

14. A map display apparatus comprising:
an image information reading unit configured to read image capturing position information of a specified image from an image storage unit;
an image capturing position displaying unit configured to control displaying a map represented by map information on a screen on the basis of the read image capturing position information;
a current position obtaining unit configured to obtain current position information from a position determining unit configured to determine a current position;
a current position displaying unit configured to control displaying a map represented by map information on a screen on the basis of the obtained current position information; and
a map display switching unit configured to selectively switch between the map information of the image capturing position displaying unit and the map information of the current position displaying unit in response to a display switching instruction.

15. An electronic device comprising:
circuitry configured to
read image capturing position information of a specified image from a memory;
control displaying a map represented by map information on a screen on the basis of the read image capturing position information;
obtain current position information from position determining circuitry configured to determine a current position;
control displaying a map represented by map information on a screen on the basis of the obtained current position information; and
selectively switch between the map information displayed on the screen on the basis of the read image capturing position information and the map information displayed on the screen on the basis of the obtained current position information in response to a display switching instruction.

16. The electronic device of claim 15, wherein the circuitry is configured to:
control displaying the map represented by the map information so that an image capturing position represented by the image capturing position information of the specified image is displayed at a predetermined position on the map; and
control displaying the map represented by the map information so that the current position represented by the current position information is displayed at a predetermined position on the map.

17. The electronic device of claim 16, wherein the predetermined positions are substantially the center of the maps, respectively.

18. The electronic device of claim 16, wherein the circuitry is configured to switch between the map information displayed on the screen on the basis of the read image capturing position information and the map information displayed on the screen on the basis of the obtained current position information in response to the display switching instruction given by a graphical user interface provided on a display screen.

19. The electronic device of claim 16, wherein the circuitry is configured to:
determine whether the current position information is capable or incapable of being obtained from the position determining circuitry; and selectively switch between the map information displayed on the screen on the basis of the read image capturing position information and the map information displayed on the screen on the basis of the obtained current position information based on a result of the determining.

20. The electronic device of claim 19, wherein
the position determining circuitry is configured to be detachably connectable to the electronic device, and
the circuitry is configured to determine whether the current position information is capable or incapable of being obtained from the position determining circuitry based on whether the position determining circuitry is connected to the electronic device.

21. The electronic device of claim 19, further comprising:
a user interface configured to receive a selection switching between activation and deactivation of the position determining circuitry.

22. The electronic device of claim 21, wherein
the user interface is provided in a main body of the position determining circuitry.

23. The electronic device of claim 19, wherein
the circuitry is configured to control displaying the map represented by the map information on the screen on the basis of the current position information immediately before a state in which the current position information cannot be obtained from the position determining circuitry.

24. The electronic device of claim 16, wherein the circuitry is configured to:
select an image to be displayed in part of each of the screens; and
control switching to displaying the map information displayed on the screen on the basis of the read image capturing position information in a case that the map information displayed on the screen on the basis of the obtained current position information is displayed and the image is selected.

25. The electronic device of claim 15, further comprising:
a camera configured to capture the plurality of images.

* * * * *